United States Patent [19]

Simek

[11] Patent Number: 4,801,443
[45] Date of Patent: Jan. 31, 1989

[54] SULPHUR RECOVERY PROCESS

[75] Inventor: Iron O. Simek, Calgary, Canada

[73] Assignee: Multi-Task Engineering Ltd., Calgary, Canada

[21] Appl. No.: 47,136

[22] Filed: May 8, 1987

[30] Foreign Application Priority Data

May 13, 1986 [CA] Canada ................... 509245

[51] Int. Cl.⁴ ............................. C01B 17/04
[52] U.S. Cl. ................. 423/574 R; 423/230; 423/578 R; 423/573.1
[58] Field of Search ............... 423/574 R, 230, 573 G, 423/578 R

[56] References Cited

U.S. PATENT DOCUMENTS

| | | | |
|---|---|---|---|
| Re. 28,830 | 5/1976 | Hunt, Jr. et al. | 423/574 R |
| 3,607,132 | 9/1971 | Sudduth | 23/288 K |
| 4,255,408 | 3/1981 | Sims | 423/574 R |
| 4,309,402 | 1/1982 | Al-Muddarris | 423/574 R |
| 4,479,928 | 10/1984 | Voirin | 423/574 R |
| 4,504,459 | 3/1985 | Stothers | 423/574 R |
| 4,526,590 | 7/1985 | Palm et al. | 425/574 R |

Primary Examiner—H. M. S. Sneed
Assistant Examiner—Chung K. Pak
Attorney, Agent, or Firm—Kevin M. O'Brien

[57] ABSTRACT

A process and apparatus for elemental sulphur recovery from acid gases. By this process, acid gas, a by-product of sour natural gas from crude oil processing plants, is mixed with air and introduced to a partial oxidization furnace, and hot products of oxidization are then passed to a catalyst regenerator where elemental sulphur is vaporized. The sulphur is then recovered in a sulphur condenser, and regenerated catalyst is recycled to a catalyst contactor in a continuous flow arrangement. Also disclosed is a sulphur recovery apparatus comprising a catalyst contactor, catalyst regenerator, and sulphur condenser which operates in continuous fashion.

1 Claim, 5 Drawing Sheets

SULPHUR RECOVERY PROCESS

BACKGROUND OF THE INVENTION

This invention relates to improved sulphur recovery units and to processes which use these units. More particularly, this invention relates to a sulphur recovery process and apparatus which continuously circulates catalyst and which may be operated in a smooth and continuous fashion.

The present invention is directed to chemical reactions leading to the removal of sulphur compounds from gaseous streams. This removal is generally carried out through the partial oxidation of $H_2S$ by air, thereby forming a mixture of $H_2S$ and $SO_2$, and through the subsequent reaction of $H_2S$ and $SO_2$ to produce elemental sulphur and water vapor.

The partial oxidation of $H_2S$ is frequently accomplished in Claus reaction furnaces using controlled amounts of air to obtain approximately a 2:1 $H_2S/SO_2$ mixture in the resulting gases. Although a substantial part of the subsequent $H_2S$ and $SO_2$ reaction also frequently occurs in reaction furnaces, generally up to one-third of the $H_2S$ and $SO_2$ present in the reaction furnace must be transferred downstream for further catalytic processing.

In prior art processes, sulphur containing gases removed from the reaction furnaces are typically heated to a temperature above the sulphur dew point in order to avoid plugging the catalyst pores. At such temperatures, the rate of reaction is relatively slow and has to be repeated, generally three times, to achieve up to 98% (theoretical) conversion. In addition, the sulphur vapor produced in this reaction generally must be condensed after each step and reaction gases have to be reheated prior to contacting the next catalyst bed.

The remaining 2% of non-converted sulphur is usually removed in installations commonly known as tail gas clean up units. Such units operate using catalysts similar to those included in upstream catalyst converters, but at temperatures below the sulphur dew point in order to improve conversion. Catalyst plugging generally occurs in these units, which requires the use of multiple units and thus intermittent operation. Generally, multiple units are utilized such that when catalyst sulphur plugging reaches a predetermined value in one converter, a freshly regenerated converter is engaged in operation while the catalyst in the plugged converter is regenerated. Typically, three converters are used, one in production, one being regenerated, and one in post-regeneration cooling.

Although relatively high sulphur conversion can be achieved using the prior art combination processes, the use of multiple reaction beds results in a relatively high capital and energy cost as well as a complex flow pattern.

The problems suggested in the preceding are not intended to be exhaustive, but rather are among many which tend to reduce the effectiveness of prior art sulphur recovery systems. Other noteworthy problems may also exist, however, those presented above should be sufficient to demonstrate that such units appearing in the prior art have not been altogether satisfactory.

OBJECTS AND SUMMARY OF THE INVENTION

It is a general object of the present invention to provide a novel sulphur recovery process and apparatus which will obviate or minimize problems of the type previously described.

It is a particular object of the present invention to provide a continuous process for sulphur recovery utilizing a moving and/or fluidized catalyst bed.

It is another object of the present invention to provide a catalytic sulphur recovery process which operates at a relatively low temperature.

It is yet another object of the present invention to provide a sulphur recovery process which requires reduced capital and energy usage.

It is still another object of the present invention to provide a sulphur recovery process which produces a relatively sulphur free gas stream.

It is a further object of the present invention to provide an apparatus for effecting continuous solid, fine catalyst particle flow in a sulphur recovery system.

It is still a further object of the present invention to provide a catalytic sulphur recovery system capable of producing relatively pure output gases at relatively low temperatures.

BRIEF SUMMARY OF THE INVENTION

One preferred embodiment of the invention which is intended to accomplish at least some of the foregoing objects resides in a process for sulphur recovery comprising the steps of:

introducing a first gas stream containing gaseous sulphur compounds to a catalyst regenerator, the catalyst regenerator having a gas stream inlet means and a gas stream outlet means and a catalyst inlet means and a catalyst outlet means, and said catalyst regenerator containing a moving bed of catalyst particles;

contacting the first gas stream with the catalyst particles at a temperature sufficient to vaporize sulphur from the catalyst surface and to produce a second sulphur rich gas stream;

removing the second sulphur rich gas stream from the regenerator and passing the second gas stream to a sulphur recovery unit;

removing sulphur from the second gas stream in the sulphur recovery unit and thereby producing a third gas stream;

withdrawing relatively sulphur free catalyst particles from the regenerator and transporting the catalyst to a catalyst contacting unit;

contacting the third gas stream with the relatively sulphur-free catalyst in the catalyst contacting unit to produce a fourth relatively sulphur-free gas stream and relatively sulphur-rich catalyst; and passing the relatively sulphur-rich catalyst to the catalyst regenerator.

In another preferred embodiment of the invention, an apparatus for sulphur recovery comprises:

a catalyst regenerator having gas inlet and outlet means, catalyst inlet and outlet means, and at least one gas-solid separator;

a sulphur condenser having gas inlet and outlet means and sulphur outlet means, and connected to said catalyst regenerator such that a relatively sulphur rich gas outlet stream from the regenerator is received in said sulphur condenser and separated into a sulphur stream and an outlet gas stream containing a reduced quantity of sulphur;

a catalyst contactor having gas inlet and outlet means and catalyst inlet and outlet means and at least one gas-solid separator;

conduit means for transporting regenerated catalyst from the regenerator through the catalyst outlet means, to the catalyst contactor inlet means and into the catalyst contactor;

conduit means for transporting said sulphur condenser outlet gas stream to said catalyst contactor gas inlet means and contacting the stream with the catalyst; and conduit means for transporting catalyst from the outlet of the catalyst contactor to the inlet of the catalyst regenerator.

Other objects and embodiments of the present invention will be apparent from the following detailed description.

DETAILED DESCRIPTION

Sulphur recovery units are a secondary part of a wide range of primary processes, such as the treatment of coal, oil and gas. Accordingly, the particular feed to the sulphur recovery unit can vary. However, this feed will typically contain sulphur compounds in gaseous forms such as $H_2S$ and/or $SO_2$.

The conversion of these sulphur-containing compounds to elemental sulphur by a conventional Claus process is well-known and can be effected in the presence of a variety of catalysts. Examples of such catalysts, and a number of their typical properties, are set forth as follows:

| Catalyst Designation | F-1 | S-100 | H-151 |
|---|---|---|---|
| Size | ¼" to 8 MESH ⅛" to ¼" | ¼" | ¼" |
| Shape | granular | spherical | spherical |
| SA, $M^2$/ | 250 | 325 | 400 |
| PBD, LBS/$FT^3$ | 52 | 47 | 51 |
| Abrasion, WT % | 1.4 | .10 | .20 |
| $AL_2O_3$, WT % | 92.3 | 94.6 | 90.4 |
| $NA_2O$ | .60 | .35 | 1.6 |
| $FE_2O_3$ | .04 | .04 | .04 |
| $SIO_2$ | .09 | .03 | 2.0 |
| LOI (1200° C.) | 7.0 | 5.0 | 6.0 |
| | 100.0 | 100.0 | 100.0 |

It should be noted that the above catalysts are described for the purposes of illustration and should not be construed as limiting the scope of the present invention. In particular, it should be noted that fine catalyst particles, for example, of 60–100 Tyler mesh, can also be utilized in this invention.

The preferred embodiments of the invention will now be described with reference to the drawings, wherein like numbers refer to like parts.

Figure 1:
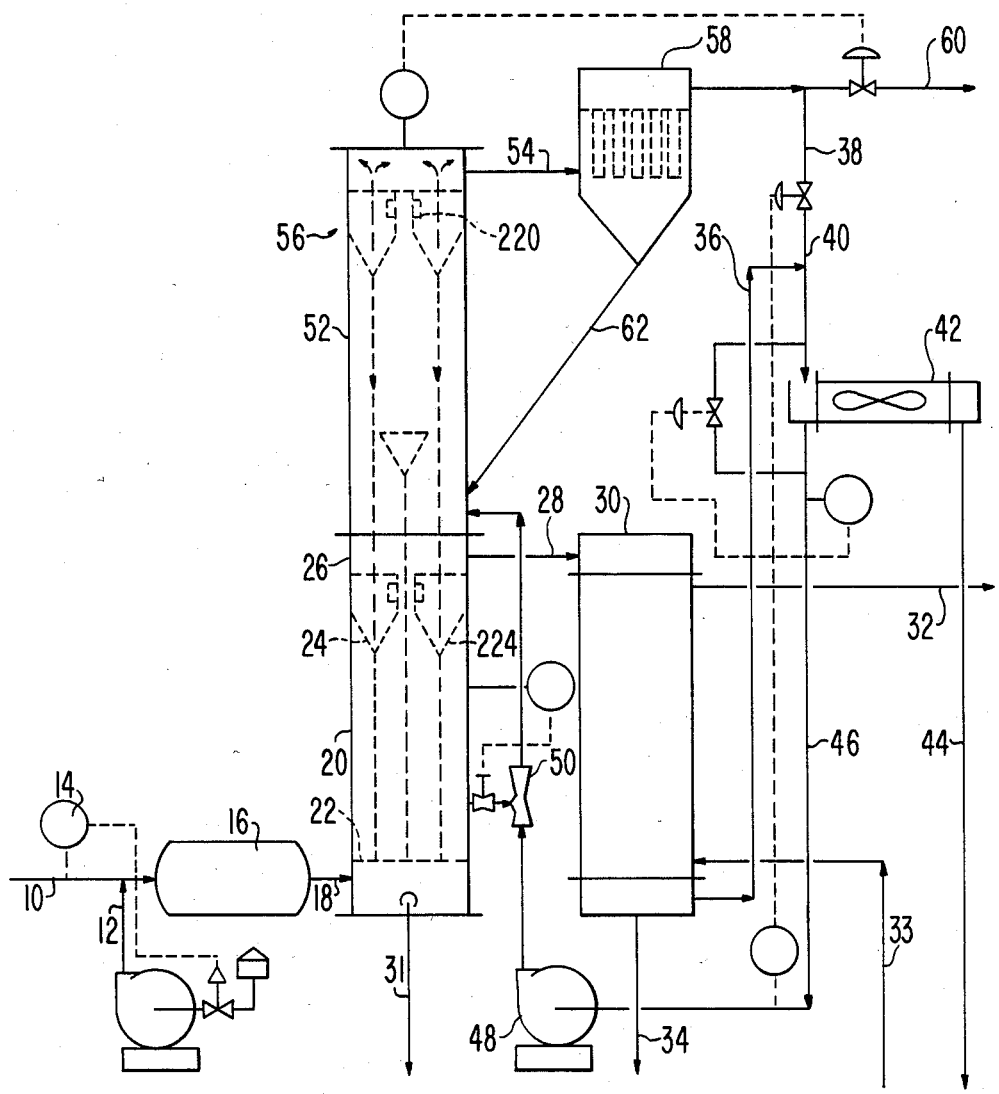
FIG. 1 is a schematic drawing of a sulphur recovery unit operated in accordance with a preferred embodiment of the present invention.

Referring now specifically to FIG. 1, a schematic drawing of a sulphur recovery unit operated in accordance with the present invention can be seen. Acid gas stream 10 is mixed with air stream 12 as controlled by an analyzer 14. The acid gas is then burned in a reaction furnace 16 and the hot reaction gases pass through a line 18 into a catalyst regenerator 20. The hot reaction gas enters the regenerator near the bottom causing fluidization of fine catalyst particles above a mesh screen 22. Concurrently, the hot reaction gas also vaporizes sulphur from the catalyst surface. Fine catalyst particles are separated from the sulphur-containing gas in a multicyclone separator battery 24 located near the head of the regenerator 26. The dust free rich sulphur gas exits from the regenerator through line 28 and enters sulphur condenser 30. In addition, any sulphur accumulating in the regenerator 20 may be removed via a drain 31.

In the sulphur condenser, heat from the sulphur rich gas and condensing sulphur is utilized to produce steam, as indicated by steam line 32 and feed water line 33. The condensed sulphur is drained through line 34 and taken to storage. Relatively cool reaction gas is removed from the sulphur condenser through line 36 and is further cooled by mixing with a small recycle stream of tail gas 38. The mixed gas stream 40 is then further cooled through heat exchange in the air cooler 42, with sour water being removed through line 44. At this point, the cool recycle gas stream 46 is directed to a recycle gas blower 48 and then to a catalyst ejector 50 where hot regenerated catalyst is blended with the recycle gas stream and carried to the bottom of the catalyst contactor vessel 52. A tangential inlet nozzle arrangement causes swirling of the catalyst particles located in contactor 52, thus extending the contacting time between the catalyst and the sulphur containing gases. The tail gas leaving the catalyst contactor through line 54 is separated from the catalyst particles by means of a multicyclone battery 56. If desired, fine solids may be removed through a sock filter 58 prior to recovery of the tail gas through line 60. Catalyst is then returned to the catalyst contactor by means of line 62.

Figure 2:
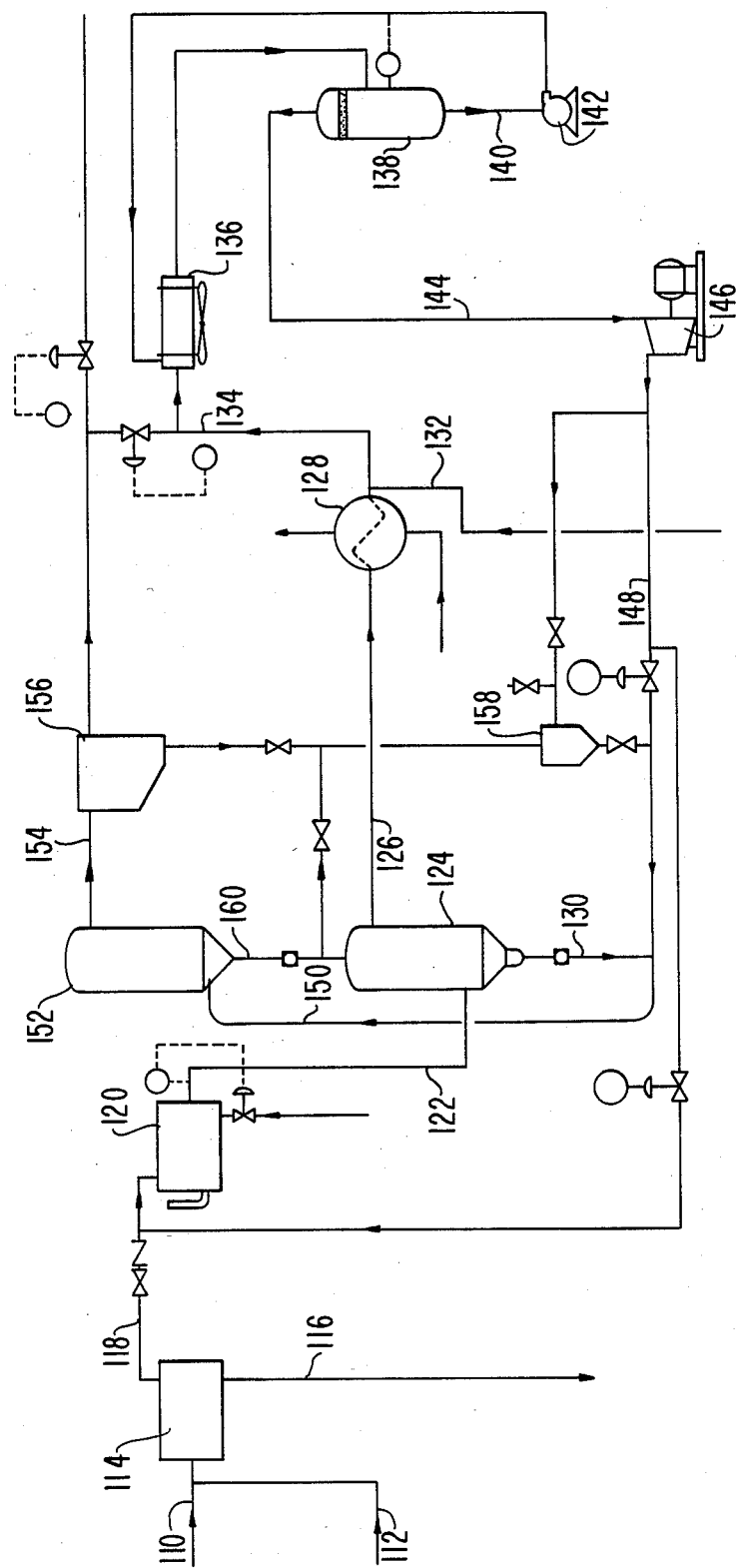
FIG. 2 is a schematic drawing of a sulphur recovery unit operated in an alternate preferred embodiment of the present invention.

An alternative preferred embodiment of the present invention is described with reference to FIG. 2. In this embodiment, an acid gas stream 110 is mixed with an air stream 112 and passed to an existing Claus furnace 114 for initial removal of sulphur products through line 116. An exiting gas stream 118 containing, for example, approximately 10% gaseous sulphur compounds is transferred to a salt bath heater 120 at a rate of approximately 40,000 pounds/hour. Upon removal from salt bath heater 120, the gaseous stream 122 is introduced to a catalyst regenerator 124.

As described above with reference to FIG. 1, in a catalyst regenerator 124 relatively hot acid gas vaporizes sulphur present on the surface of the fine catalyst particles. The sulphur rich gas is then separated from the catalyst particles by means of a cyclone separator battery located within the catalyst regenerator. In this embodiment, a sulphur rich gas stream 126 is removed from catalyst regenerator 124 and passed to a sulphur condenser 128 while regenerated catalyst is removed from the lower section of catalyst regenerator through line 130. In sulphur condenser 128, sulphur is removed through line 132 at a rate of approximately 5,000 pounds per hour while sulphur condenser outlet gas is removed through line 134 at a rate of approximately 38,000 pounds per hour. After further cooling through an air cooler 136, sulphur condenser outlet gas is passed to a water separator 138.

In the water separator, sour water is recovered through line 140 and passed to pump 142 for removal from the system while cool recycle gas stream 144 is directed to a compressor 146 at a rate of roughly 29,000 pounds/hour. A recycle gas stream 148 is then mixed with regenerated catalyst from line 130 and a resultant stream 150 is introduced to a catalyst contactor 152. The resultant relatively sulphur free tail gas is removed through line 154 and passed to a sock filter 156 for removal of fine catalyst particles. If desired, these fine catalyst particles can be combined with recycle gas stream 148 by means of a catalyst make-up pot 158.

In addition, sulphur containing catalyst from the catalyst contactor is passed through a line 160 to catalyst regenerator 124 at a rate of approximately 0.08 cubic feet per second for contact with hot acid gases as described previously.

As noted above, the present invention further comprises a unique apparatus for accomplishing sulphur recovery. With reference to FIG. 2, this apparatus comprises catalyst regenerator 124 and inlet and outlet gas and catalyst lines 122, 126, , 130 and 160, sulphur condenser 127 and inlet and outlet lines 126, 132 and 134, gas recycle line 148, catalyst contactor 152, inlet line 150 which may also concurrently function as a lift pipe reactor, and outlet line 154.

Figure 3:
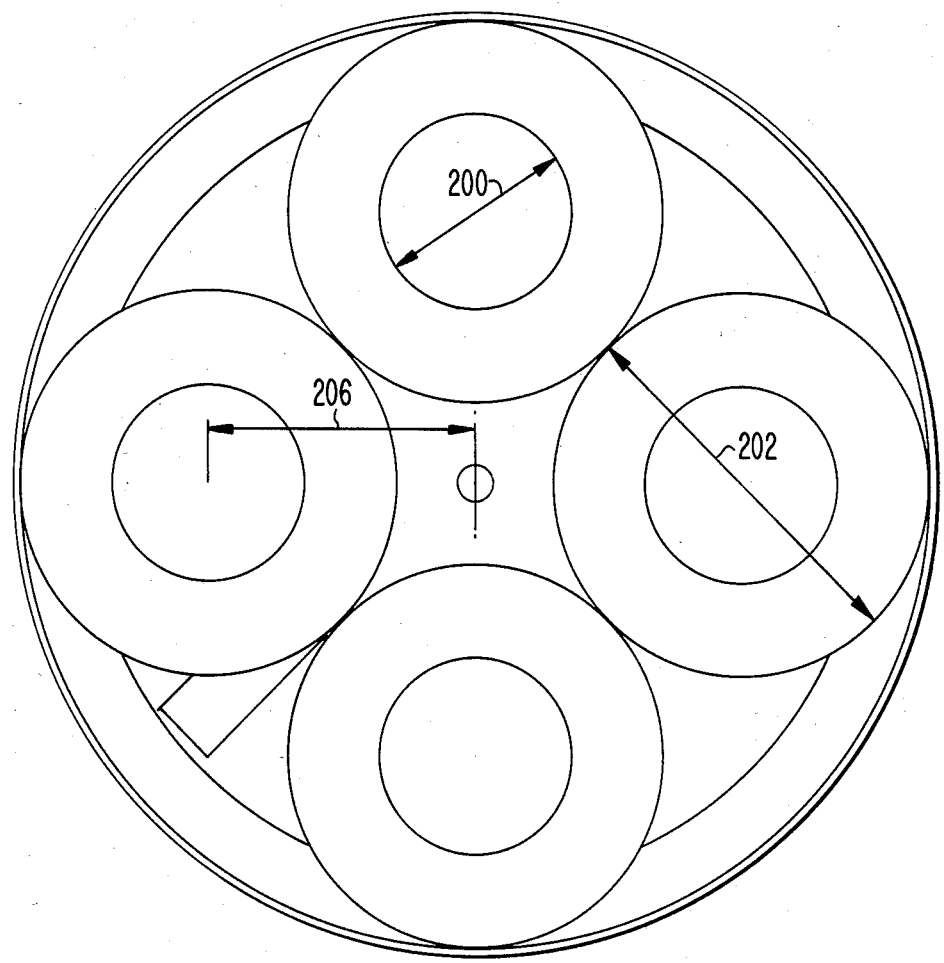
FIG. 3 is a top view of a multicyclone battery included in the catalyst contactor and catalyst regenerator of FIGS. 1 and 2.

In addition, as previously described, the catalyst regenerator and catalyst contactor each contain gas-solid separation means. This gas-solid separation means can be of various configurations, such as one or more filters or electrostatic precipitators. In a preferred embodiment, these separation means comprise a battery of cyclone separators shown schematically in FIGS. 3, 4 and 5. In this regard, FIG. 3 shows a top view of the multicyclone battery geometry comprising cyclones of the type shown at 24 in FIG. 1. In the embodiment described in FIG. 2, and utilizing cyclones having an inner surface of the type described in FIG. 4, the inside diameter 200 of the cyclone separators would be approximately 6 inches with the outside diameter 202 of each cyclone separator being approximately 12 inches. By this arrangement, the distance 206 from the axial center of the regenerator to the center of each cyclone separator would be approximately 8½ to 9 inches. As noted, the above figures are presented for purposes of illustration and do not limit or define the scope of this invention.

Figure 4:
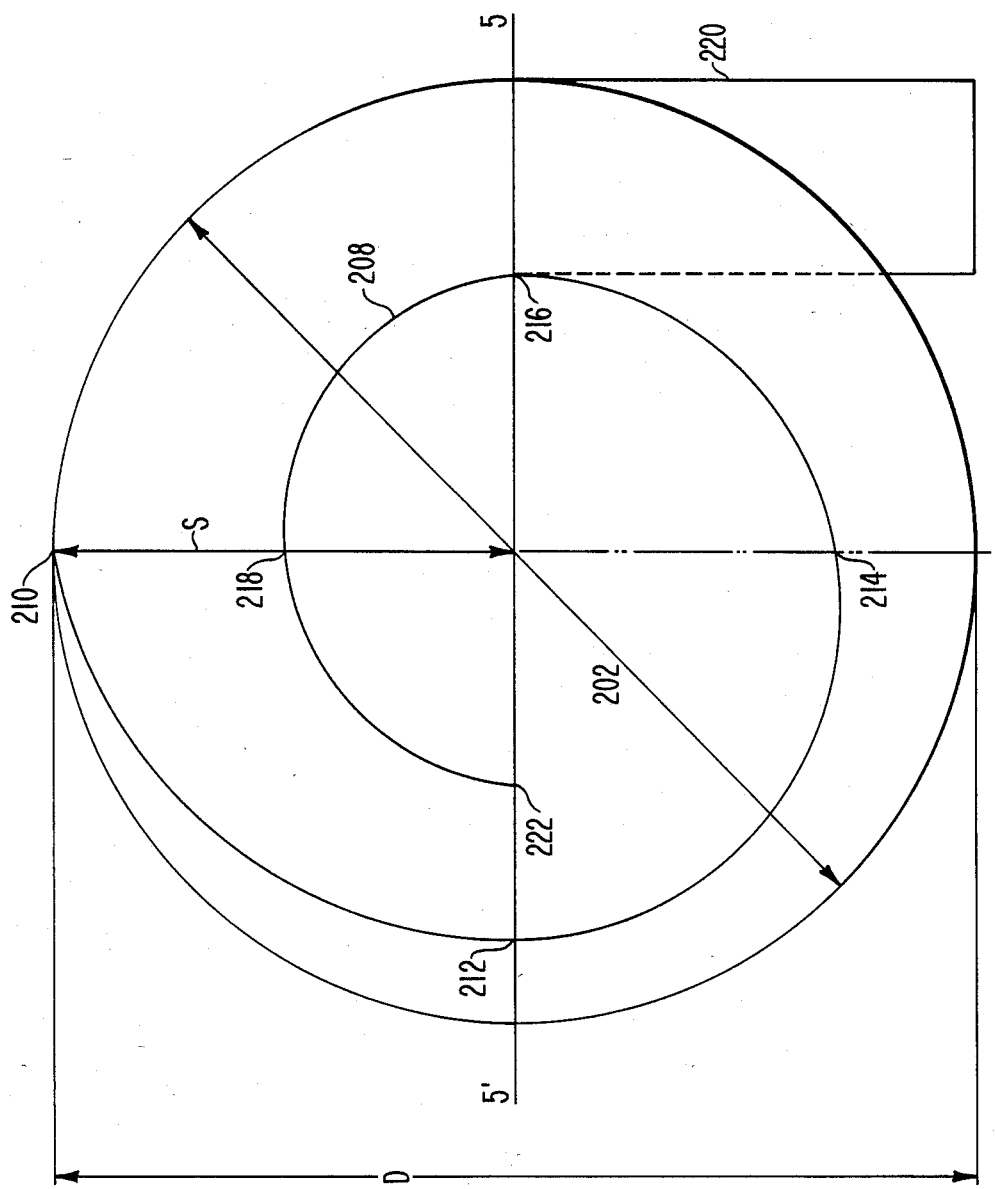
FIG. 4 is a top view of a single cyclone separator of the type shown in FIG. 3.

FIG. 4 shows a top view of an individual cyclone shown in FIG. 3 and illustrates a unique spiral arrangement within each cyclone separator.

By this arrangement, each cyclone contains an inner spiral plate 208 designed to increase the curvature of the cyclone contant surface. Since gas-solid cyclone separation is based, in part, on centrifugal force effects, inclusion of the inner spiral plate enhances the overall separation. This is particularly important in separation systems involving catalyst particles of 150 Tyler mesh or smaller.

Figure 5:
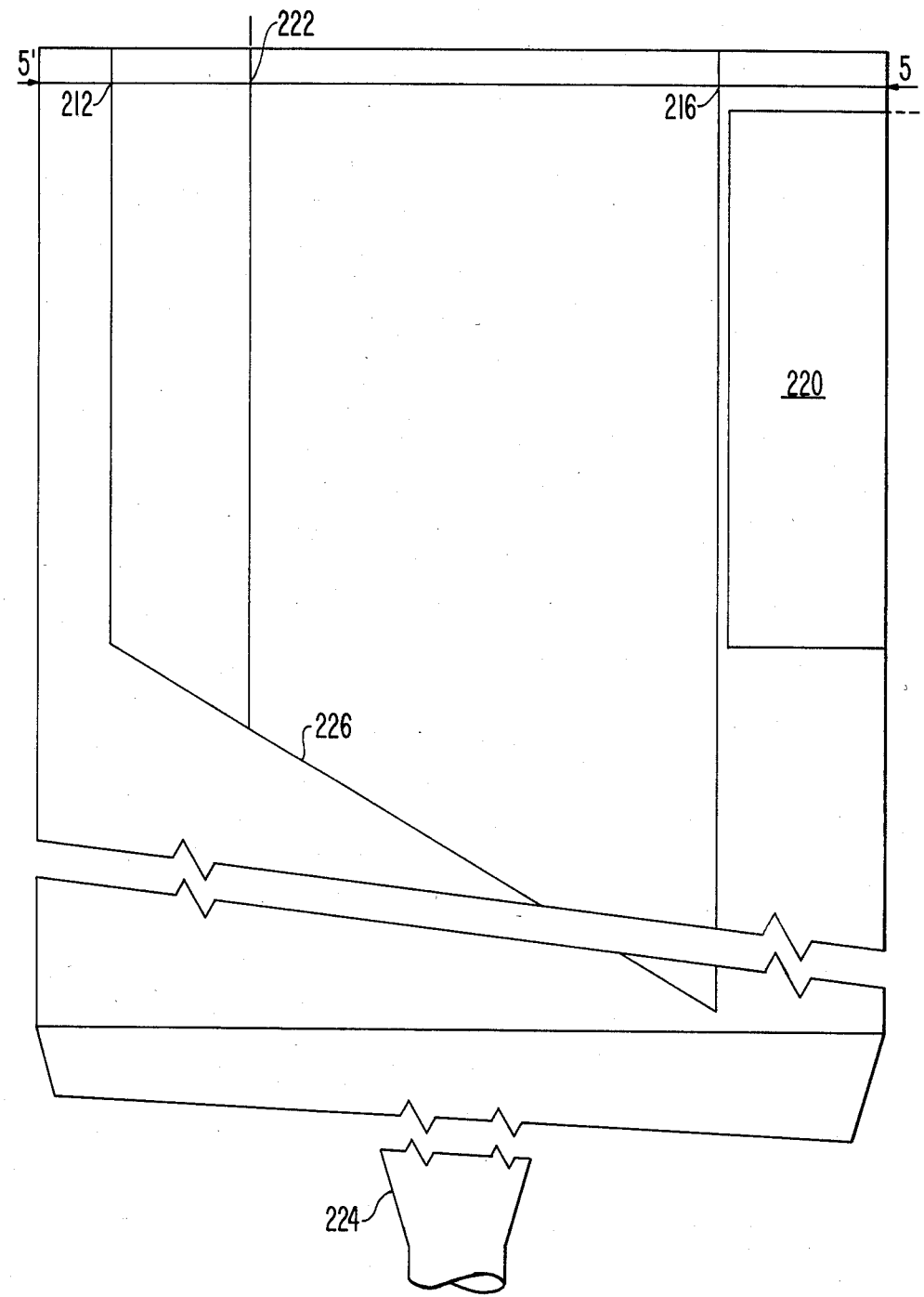
FIG. 5 is a side view of a single cyclone separator shown in FIGS. 3 and 4.

As shown in FIG. 4, the inner spiral plate 208 forms a smooth curved spiral. In the preferred embodiment, this smooth inner cyclone surface is formed in accordance with the equation $S = D \times 0.489639 \, e^{-0.001846 \times \text{deg}}$, where "S" represents the distance at a given point of the inner surface from the longitudinal center of the cyclone, "D" represents the diameter of the cyclone and "deg" represents the number of radial degrees from a fixed point where the inner surface meets the outer cyclone surface. Thus, for example, as shown in FIG. 4, point 210 would represent 0 degrees, point 212 would represent 90 degrees, point 214 would represent 180 degrees, point 216 would represent 270 degrees and point 218 would represent 360 degrees. In addition, each cyclone contains an inlet pipe 220 as shown in FIGS. 1, 4 and 5.

Finally, as noted above, FIG. 5 shows a partial side view of the cyclone shown in FIG. 4. As previously described, catalyst and gases enter the cyclone through inlet 220 and are swirled through contact with the inner spiral plate, the lower edge 226 of which is of a sinusoidal shape. Gases flow out the top of the cyclone, with catalyst descending through the lower cyclone portion 224.

In describing the above invention, reference has been made to particularly preferred embodiments. Those skilled in the art, however, and familiar with the disclosure of the subject invention may recognize additions, deletions, substitutions, modifications and/or other changes which will fall within the purview of the invention as described in the following claims.

I claim:

1. A continuous catalyst flow process for sulphur recovery comprising the steps of:

continuously introducing a first gaseous stream comprising Claus reaction gases having a ratio of $H_2S$ to $SO_2$ of 2:1 to a continuous catalyst flow regenerator, said regenerator having a gas stream inlet means and a gas stream outlet means and a catalyst inlet means and a catalyst outlet means, and said catalyst regenerator containing a continuously moving bed of sulphur containing catalyst particles;

continuously contacting said first gaseous stream with said sulfur containing catalyst particles at a temperature sufficient to vaporize sulphur from the surface of said catalyst particles and to produce a second gaseous stream, said second gaseous stream containing a higher elemental sulphur content than said first gaseous stream;

continuously removing said second gaseous stream from said regenerator and passing said second gaseous stream to a sulphur condenser;

continuously recovering sulphur from said second gaseous stream in said sulphur condenser and thereby producing a third gaseous stream;

continuously withdrawing said catalyst particles from said regenerator after contact with said first gaseous stream and passing the resulting regenerated catalyst particles to a regenerated catalyst transport device;

cooling said third gaseous stream below the water dew point temperature;

continuously separating water from said third gaseous stream and thereby producing a fourth gaseous stream having a lower water vapor content than said third gaseous stream;

increasing the pressure of said fourth gaseous stream and then passing said fourth gaseous stream to said regenerated catalyst transport device;

continuously transporting said regenerated catalyst particles from said catalyst regenerator in said catalyst transport device to a catalyst contacting unit by means of said fourth gaseous stream;

continuously contacting said fourth gaseous stream with said regenerated catalyst particles in said catalyst contactor and thereby depositing sulphur on the surface of said catalyst particles and producing a fifth gaseous stream containing a lower content of sulphur compounds than said first gaseous stream;

continuously withdrawing said fifth gaseous stream from the catalyst contactor; and continuously passing said catalyst particles from said catalyst contactor to said catalyst regenerator after contact with said fourth gaseous stream.

* * * * *